United States Patent
Tofigh et al.

(10) Patent No.: US 7,760,482 B2
(45) Date of Patent: Jul. 20, 2010

(54) POWER CONTROLLER WITH FUSIBLE LINK

(75) Inventors: Farshid Tofigh, Mission Viejo, CA (US); Otmar Kruppa, Deiningen (DE); Jesse Thomas Chen, Los Angeles, CA (US)

(73) Assignee: Leach International Corporation, Buena Park, CA (US)

( * ) Notice: Subject to any disclaimer, the term of this patent is extended or adjusted under 35 U.S.C. 154(b) by 590 days.

(21) Appl. No.: 11/555,112

(22) Filed: Oct. 31, 2006

(65) Prior Publication Data
US 2008/0100411 A1    May 1, 2008

(51) Int. Cl.
*H02H 5/04* (2006.01)
(52) U.S. Cl. ..................... 361/103
(58) Field of Classification Search ............ 361/103
See application file for complete search history.

(56) References Cited

U.S. PATENT DOCUMENTS

| | | | |
|---|---|---|---|
| 5,287,078 A | 2/1994 | Larson | |
| 5,638,237 A | 6/1997 | Phipps et al. | |
| 6,043,966 A * | 3/2000 | Krueger et al. | 361/104 |
| 6,114,674 A | 9/2000 | Baugh et al. | |
| 6,172,482 B1 * | 1/2001 | Eguchi | 320/134 |
| 6,351,361 B1 * | 2/2002 | Kawazu et al. | 361/103 |
| 6,456,186 B1 * | 9/2002 | Oglesbee | 337/161 |
| 6,764,446 B2 * | 7/2004 | Wolinsky et al. | 600/300 |
| 7,116,208 B2 * | 10/2006 | Nishimura et al. | 337/296 |
| 2006/0052905 A1 | 3/2006 | Pfingsten et al. | |

FOREIGN PATENT DOCUMENTS

WO    WO 2005/038952 A2    4/2005

OTHER PUBLICATIONS

International Search Report for Application No. PCT/US07/82567 filed Oct. 25, 2007, dated Jan. 27, 2008, mailed Jun. 4, 2008, 2 pages.
Written Opinion for Application No. PCT/US07/82567 filed Oct. 25, 2007, dated Jan. 28, 2008, mailed Jun. 4, 2008, 6 pages.

* cited by examiner

*Primary Examiner*—Stephen W Jackson
*Assistant Examiner*—Scott Bauer
(74) *Attorney, Agent, or Firm*—Christie, Parker & Hale, LLP

(57) ABSTRACT

The present invention relates to a power control system with a fusible link. In one embodiment, the invention relates to a power control system, having a device possessing an output, a fusible link connected to the output of the device, a heating element controller, and at least one heating element connected to the heating element controller, where the heating element controller is configured to control the flow of current through the heating element, where the heating element controller is configured to monitor activity of the device, and where the heating element is configured to generate sufficient heat to fuse the fusible link within a predetermined time period when current flows through the heating element.

38 Claims, 11 Drawing Sheets

POWER CONTROLLER WITH FUSIBLE LINK

BACKGROUND

The present invention relates generally to the supply of power to loads and more specifically to the supply of power via devices that can protect wiring from damage due to over-currents or short circuits.

Semiconductor devices such as field effect transistors (FETs) can be used in devices that provide over-current protection to a load. These devices operate by controlling the amount of current provided to a load by monitoring the flow of current through the device. If the semiconductor device fails in a manner that allows current to flow uncontrolled through the load (i.e. fail shorted), then the result can be damage to the wiring and/or load.

SUMMARY OF THE INVENTION

Aspects of the invention relate to a power control system with a fusible link. In one embodiment, the invention relates to a power control system, having a device possessing an output, a fusible link coupled to the output of the device, a heating element controller, and at least one heating element coupled to the heating element controller, where the heating element controller is configured to control the flow of current through the heating element, where the heating element controller is configured to monitor activity of the device, where the heating element is configured to generate sufficient heat to fuse the fusible link within a predetermined time period when current flows through the heating element, where the fusible link includes a circuit trace, where the heating element includes a circuit trace having a repeating pattern including a first section and a second section connected perpendicular to the first section, and where the heating element is configured to concentrate the generated heat on the fusible link.

In another embodiment, the invention relates to a power control system, having a microprocessor coupled to a first switching device and a sensor circuit, a heating element coupled to the first switching device, a second switching device coupled to the sensor circuit, a fusible link coupled to the second switching device and the first switching device, and a load coupled to the fusible link, where the sensor circuit is configured to monitor a connection between the second switching device and the fusible link, where the fusible link includes a circuit trace, where the heating element includes a circuit trace having a repeating pattern including a first section and a second section connected perpendicular to the first section, and where the heating element is configured to concentrate the generated heat on the fusible link.

In yet another embodiment, the invention relates to printed circuit board, having a first trace, and a second trace proximate the first trace, where the first trace is intentionally configured to fuse when a current exceeding a first threshold flows through the first trace and the second trace, where the second trace connects a first point to a second point, where the length of the second trace is greater than the distance between the first and second points, where the second trace is configured to generate heat, where the first trace is configured to receive the generated heat, and where the second trace is configured to concentrate the generated heat on the fusible link.

In still yet another embodiment, the invention relates to a method of operating a power control system with a fusible link including the steps of measuring a current flow, measuring a device state, determining whether a fault has occurred using the measured current flow and determined device state, and generating heat proximate the fusible link, where the fusible link includes a circuit trace, where the heating element includes a circuit trace having a repeating pattern including a first section and a second section connected perpendicular to the first section, and where the heating element is configured to concentrate the generated heat on the fusible link.

DETAILED DESCRIPTION OF THE INVENTION

Turning now to the drawings, power control systems in accordance with an embodiment of the present invention are illustrated. The power control system typically includes a fusible device, a fusible link, a load, a ground, a heating element, and a heating element controller. The fusible device is connected to the fusible link and the heating element controller. The fusible link is connected to the load and the heating element controller. The heating element is connected to the heating element controller and the ground. The load is connected to ground. The fusible device can be a solid state switch, an electromechanical device such as a relay or contactor, or any other device needing protection against over-current conditions.

In operation, the current output of the fusible device is monitored by the heating element controller. The heating element controller responds to the detection of a fault in the fusible device by allowing current to flow through the heating element. The fault in the fusible device causes a current of a greater magnitude than normal to flow through the fusible link. The current flowing through the fusible link generates heat in the fusible link. Heat generated by the heating element further heats the fusible link, decreasing the time that the fault condition remains by causing the fusible link to melt rapidly.

The heating element controller can pulse current through the heating element, also causing the fusible link to melt more rapidly.

Figure 1:
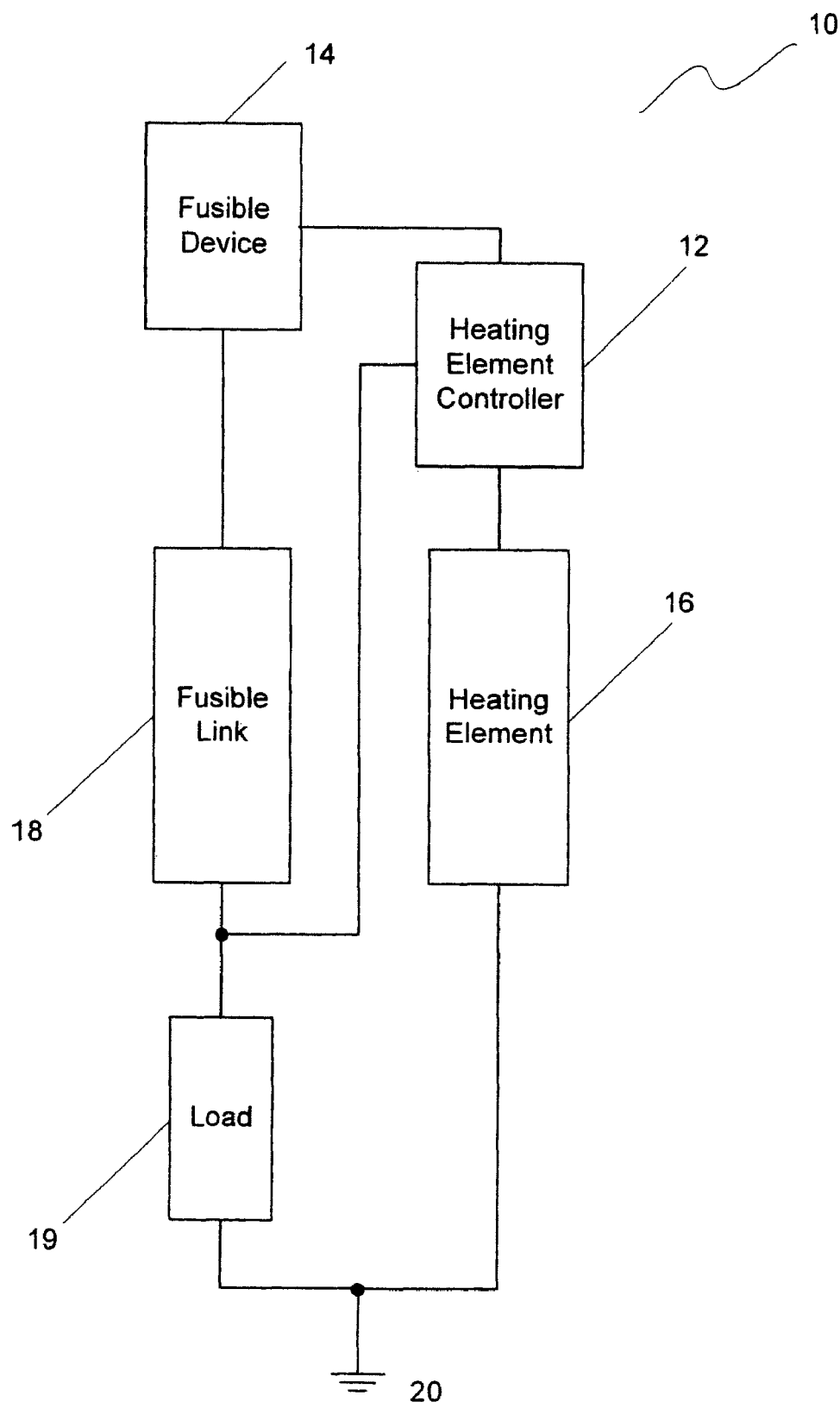
FIG. 1 is a schematic block diagram of a power control system in accordance with an embodiment of the present invention.

A power control system in accordance with an embodiment of the present invention is shown in FIG. 1. The power control system 10 includes a fusible device 14, a fusible link 18, a load 19, a ground 20, a heating element 16, and a heating element controller 12. The fusible device 14 is connected to the fusible link 18 and the heating element controller 12. The fusible link 18 is connected to the load 19 and the heating element controller 12. The load 19 is connected to the heating element controller 12 and the ground 20. The heating element 16 is connected to the heating element controller 12 and the ground 20.

In operation, the heating element controller can be configured to monitor the fusible device and to detect a fault in the fusible device. The heating element controller can respond to the detection of a fault by activating the heating element. The fault in the fusible device can cause a current, a fault current, to flow through the fusible link. The fault current flowing through the fusible link can generate heat in the fusible link. In activating the heating element, the heating element controller can allow the fault current to flow through the heating element. In many embodiments, the heating element is activated by using a switch to connect the fusible element to ground by the heating element. As the fault current flows though the heating element, the heating element can further heat the fusible link causing it to melt. Melting the fusible link or fusing prevents current from flowing to the load. Fusing can be defined to be the permanent destruction of the current path through the fusible link such that the impedance is approximately 1 mega-ohm or greater.

The heating element controller and heating element can enable the fusible link to respond more rapidly to a fault. The heating element is proximate to the fusible link such that at least some heat is transferred from the heating element to the fusible link. In many embodiments, a current that does not fuse the fusible link can cause the link to fuse in combination with heat from the heating element. The transfer of heat to the fusible link can depend upon the distance between the heating element and the fusible link, the number of heating elements that are used, and/or the thermal conductivity of the dielectric materials used to electrically isolate the fusible links from the heating elements.

In many embodiments, the heating element controller can include a microcontroller, microprocessor, programmable logic device and/or discrete logic components. In one embodiment, the heating element controller is implemented as part of a solid state power controller possessing a microprocessor similar to the solid state power controllers described in U.S. Provisional Patent Application No. 60/653,846 filed Feb. 16, 2005, entitled "POWER DISTRIBUTION SYSTEM USING SOLID STATE POWER CONTROLLERS", which is incorporated herein by reference in its entirety. This provisional application is now U.S. patent application Ser. No. 11/356,487.

The fusible device can be a FET, electromechanical device such as a relay or contactor, or any other device needing protection against over-current conditions.

Figure 1A:
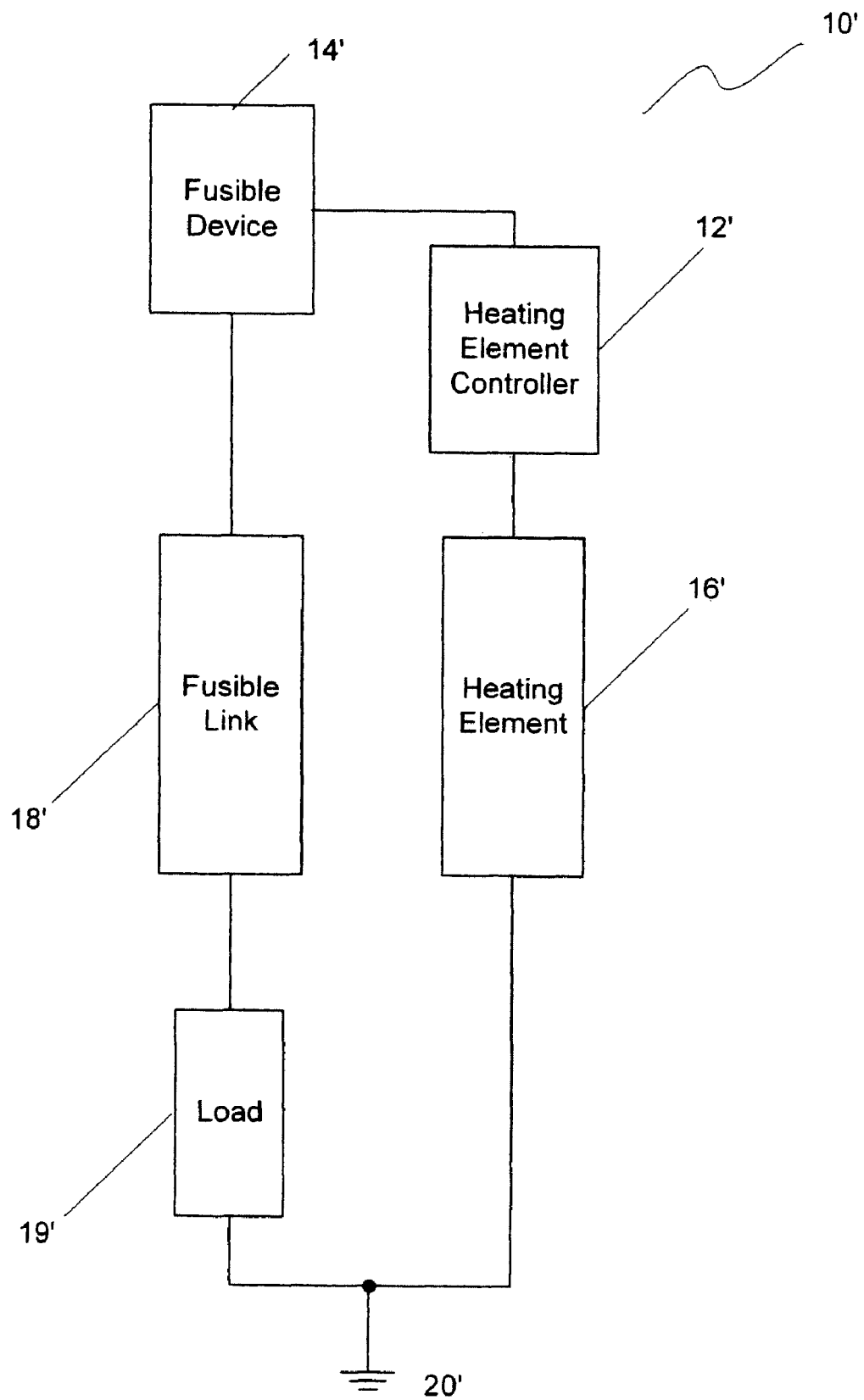
FIG. 1a is a schematic block diagram of a power control system in accordance with an embodiment of the present invention.

A schematic diagram of a power control system in accordance with another embodiment of the present invention is illustrated in FIG. 1a. The power control system 10' includes a fusible device 14', a fusible link 18', a load 19', a ground 20', a heating element 16', and a heating element controller 12'. The fusible device 14' is connected to the fusible link 18' and the heating element controller 12'. The load is connected to the fusible link 18' and the ground 20'. The heating element 16' is connected to the heating element controller 12' and the ground 20'. The power control system 10' shown in FIG. 1a is similar to the power control system 10 shown in FIG. 1 with the exception that the heating element is connected in parallel (as opposed to in series) with the load.

In many embodiments, the heating element controller can include a microcontroller, microprocessor, programmable logic device or discrete logic components. In one embodiment, the heating element controller is implemented using a solid state power controller possessing a microprocessor similar to the solid state power controllers described in U.S. Provisional Patent Application No. 60/653,846.

The fusible device can be a FET, electromechanical device such as a relay or contactor, or any other device needing protection against over-current conditions.

Figure 2:
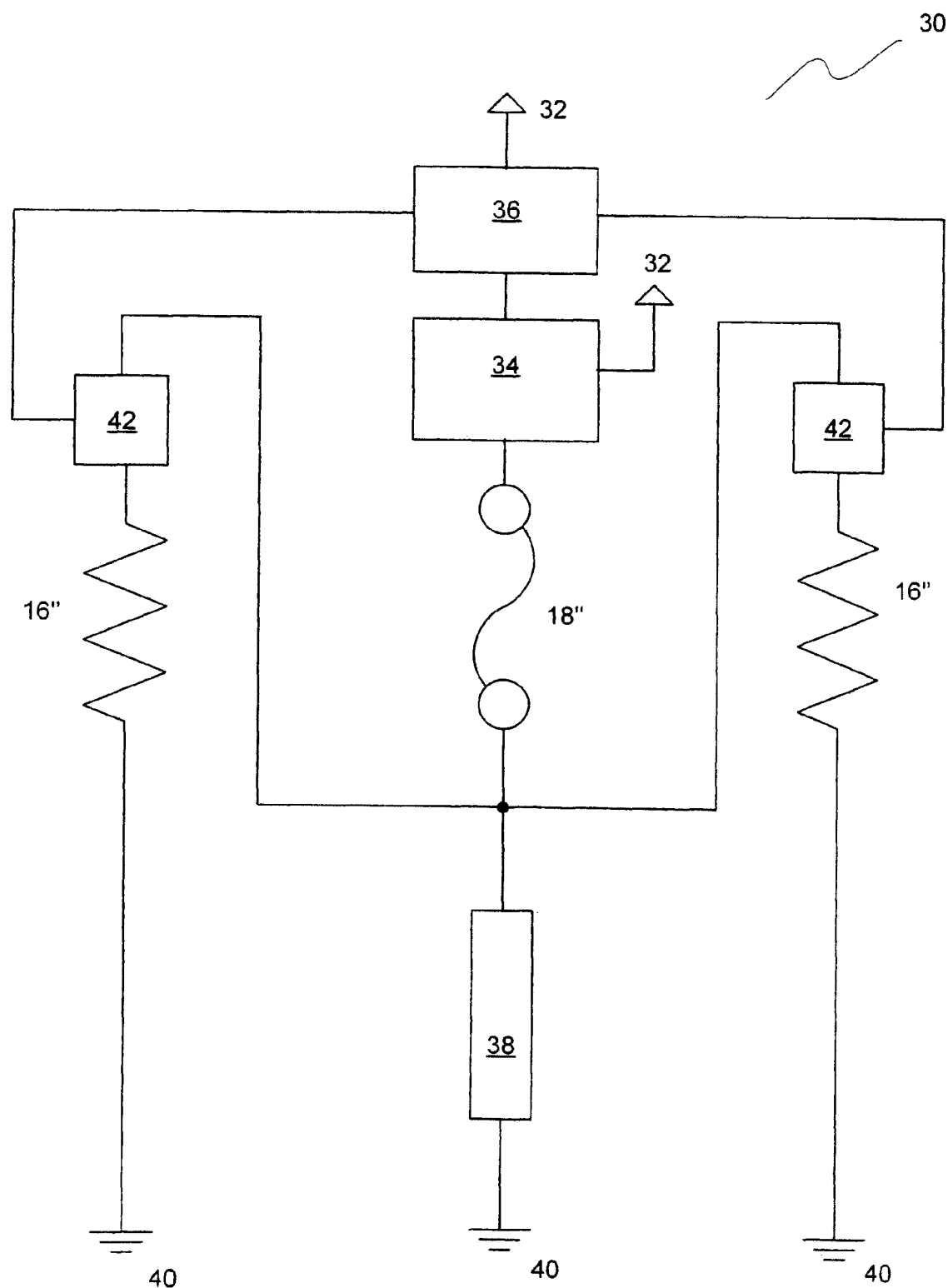
FIG. 2 is schematic diagram of a power control system in accordance with an embodiment of the present invention.

A schematic diagram of a power control system in accordance with the present invention is illustrated in FIG. 2. The power control system 30 includes a microprocessor 36, a switching device 34, two switches 42, two heating elements 16", a fusible link 18", a load 38, a ground 40, and a power source 32. The power controller 34, acting as a fusible device, includes a current input, current output, and at least one control line. The current input is connected to a power source 32 and the current output is connected to the fusible link 18". The load 38 is connected to the fusible link 18" and the ground 40.

The control lines of the switching device 34 are connected to the microprocessor 36. The microprocessor and the two switches can be thought of as a heating element controller. The switches 42 each have a current input and a current output. The current inputs of the switches 42 are connected to the load 38 and the fusible link 18". The current outputs of the switches 42 are each connected to a heating element 16" that is proximate to the fusible link 18". Both heating elements 16" are connected to ground 40.

In operation, the switching device is capable of controlling the supply of current to the load via the fusible link. The microprocessor can monitor the power controller for a failure. In an exemplary embodiment, the failure is an over-current condition. Under ideal conditions, the power controller can interrupt the flow of current to protect the wiring and the load such that it becomes an open circuit and current is prevented from flowing to the load. If the power controller fails in a way that enables current to continue to flow through the load (fault current), the microprocessor activates the switches to enable the fault current to flow from the fusible link through the heating elements. As fault current flows through the fusible link, it can heat the fusible link. As the fault current flows from the fusible link through each heating element, heat is also generated by the heating elements.

Having the heating elements in series with the fusible link can decrease the fusing time of the link. Upon activation of the switches, fault current can increase as the heating elements reduce the overall resistance seen by the fault current after passing through the fusible link. The switches can be tolerant to the fault current. The increased fault current can provide additional heat within the fusible link. Heat from the heating elements also increases the temperature of the fusible link. The combination of the heat generated by the heating elements and the heat generated by current flowing through the fusible link can cause the fusible link to melt. The melting process can be referred to as fusing, as discussed above. Once the fusible link has melted, current is prevented from flowing to the load.

In one embodiment, the switching device system can be implemented in part using a solid state power controller. In other embodiments, other types of circuits can be used to regulate the current supplied to the load. In one embodiment, the microprocessor is a F8051 microprocessor manufactured by Silicon Laboratories, Inc. of Austin, Tex. In another embodiment, the microprocessor is a PIC12F629 manufactured by Microchip Technology, Inc. of Chandler, Ariz. In one embodiment, the microprocessor monitors the load current through the use of a FET.

In several embodiments, microprocessors with computational capabilities sufficient to monitor the power controller for faults and to respond rapidly by activating one or more switching devices can be used. In other embodiments, an application specific integrated circuit can be used in addition to or in substitution for a microprocessor. Discrete devices can also be used alone or in combination with other devices to detect faults and control the flow of current to the heating elements.

In one embodiment, the fusible link is constructed as a narrow circuit trace on a printed circuit board. In other embodiments, the fusible link can be constructed using a wire or circuit trace of an electrically conductive material that has a low resistance when the power controller is functioning normally. The wire or trace can have a melting point sufficiently low such that the wire or trace will melt when the heating elements are activated.

In one embodiment, the heating element is implemented using two thin circuit traces located on separate layers of a printed circuit board. In other embodiments, a single trace or multiple traces can be used to implement the heating elements. In addition, heating elements can be implemented using discrete elements or a combination of discrete elements and printed circuit board traces.

Figure 2A:
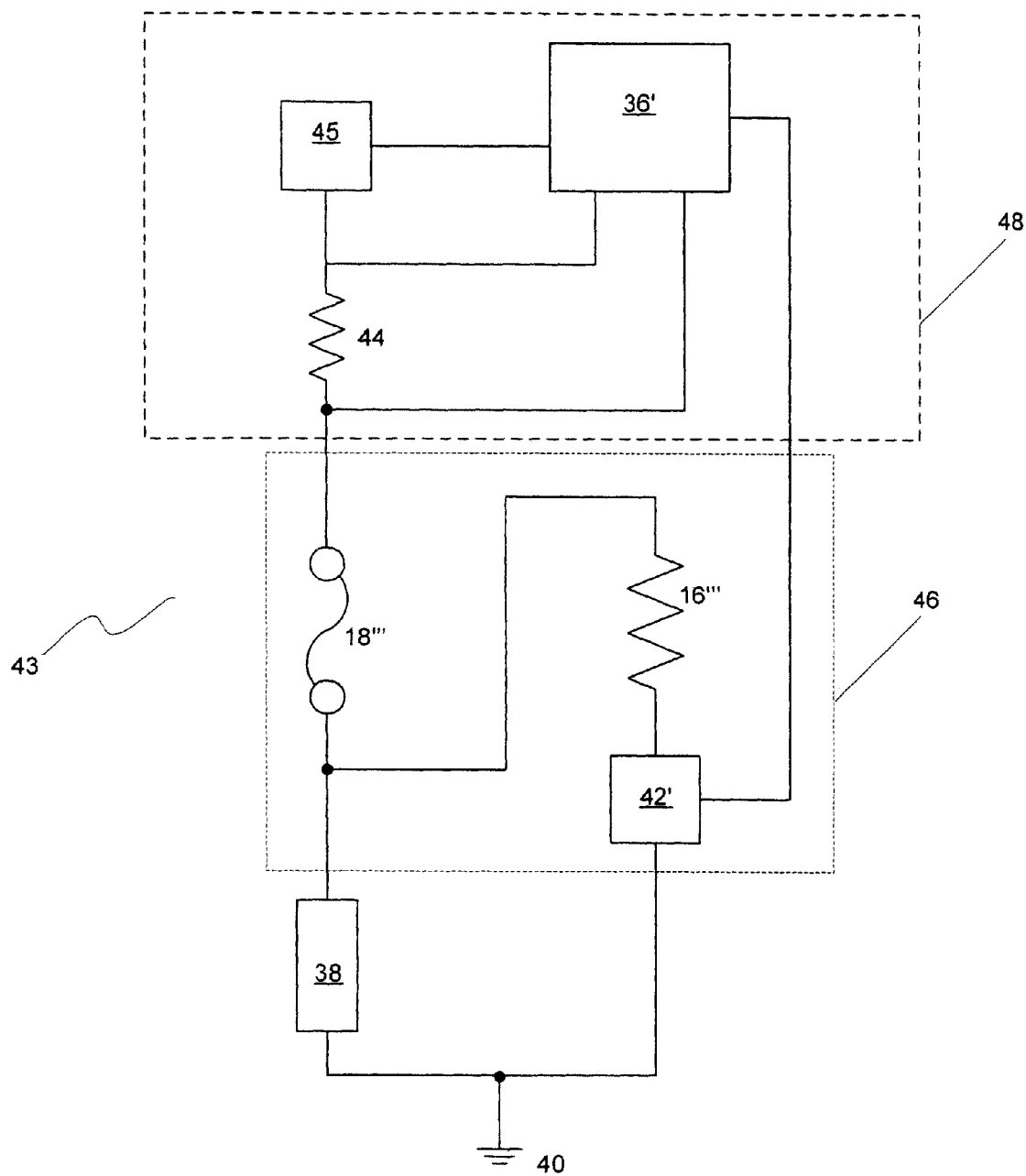
FIG. 2a is schematic diagram of a power control system in accordance with an embodiment of the present invention.

A schematic diagram of a power control system in accordance with the present invention is illustrated in FIG. 2a. The power control system 43 can include a solid state power controller 48, an active fuse 46, and a load 38. One embodiment of the solid state power controller 48 includes a FET or switch acting as power controller 45, a microprocessor 36' and a measuring resistor 44. The FET 45 includes a current input, current output and at least one control output. The current input (not shown) can be connected to an external device (not shown).

The current output of the FET 45 is connected by a measuring resistor 44 to the current input of the active fuse 46. The control output of the FET is connected to the microprocessor 36'. The microprocessor 36' is connected to the control inputs of the active fuse 46. The measuring resistor 44 has a current input and a current output. The current input and current output of the measuring resistor 44 are connected to the microprocessor 36'.

The active fuse 46 includes a fusible link 18''', a heating element 16''', a switch 42', a current input, a current output, and a control input. The current input of the active fuse 46 is connected to the fusible link 18'''. The fusible link 18''' is connected to the current output of the active fuse. The switch 42' has a current input, a current output, and a control input. The control input of the active fuse 46 is connected to the control input of the switch 42'.

The current input of the switch 42' is connected to the heating element 16''' and the current output is connected to a ground 40. The heating element 16''' is connected to the current output of the active fuse 46. The heating element 16''' is proximate to the fusible link 18''' such that at least some heat passes from the heating element 16''' to the fusible link 18''' when the heating element 16''' is activated. In other embodiments, the active fuse has multiple switches controlling multiple heating elements. The load 38 is connected to the current output of the active fuse 46 and ground 40.

In operation, the solid state power controller is capable of controlling the supply of current to the load and in the event of a fault, causing the active fuse to melt. When the active fuse melts, the load is isolated from the fault or over-current condition. The microprocessor monitors the current flowing through the measuring resistor.

In the event that the FET 45 fails by not preventing the flow of current when the FET is shut off and the microprocessor determines that the measured current has exceeded an over-current value, a fault is determined to have occurred. Over-current may be defined as a current flow above a threshold such as a proportion in excess of the rated limit of a particular load device, wire, or circuit. In response to the failure of the FET to prevent the flow of fault current, the microprocessor turns on the switch contained in the active fuse, which activates the heating element. As current flows through the heating element, heat is generated. The heat increases the temperature of the fusible link. The combination of the heat generated by the heating element and the heat generated by current flowing through the fusible link causes the fusible link to melt. Once the fusible link has melted, current is prevented from flowing to the load.

Figure 3:
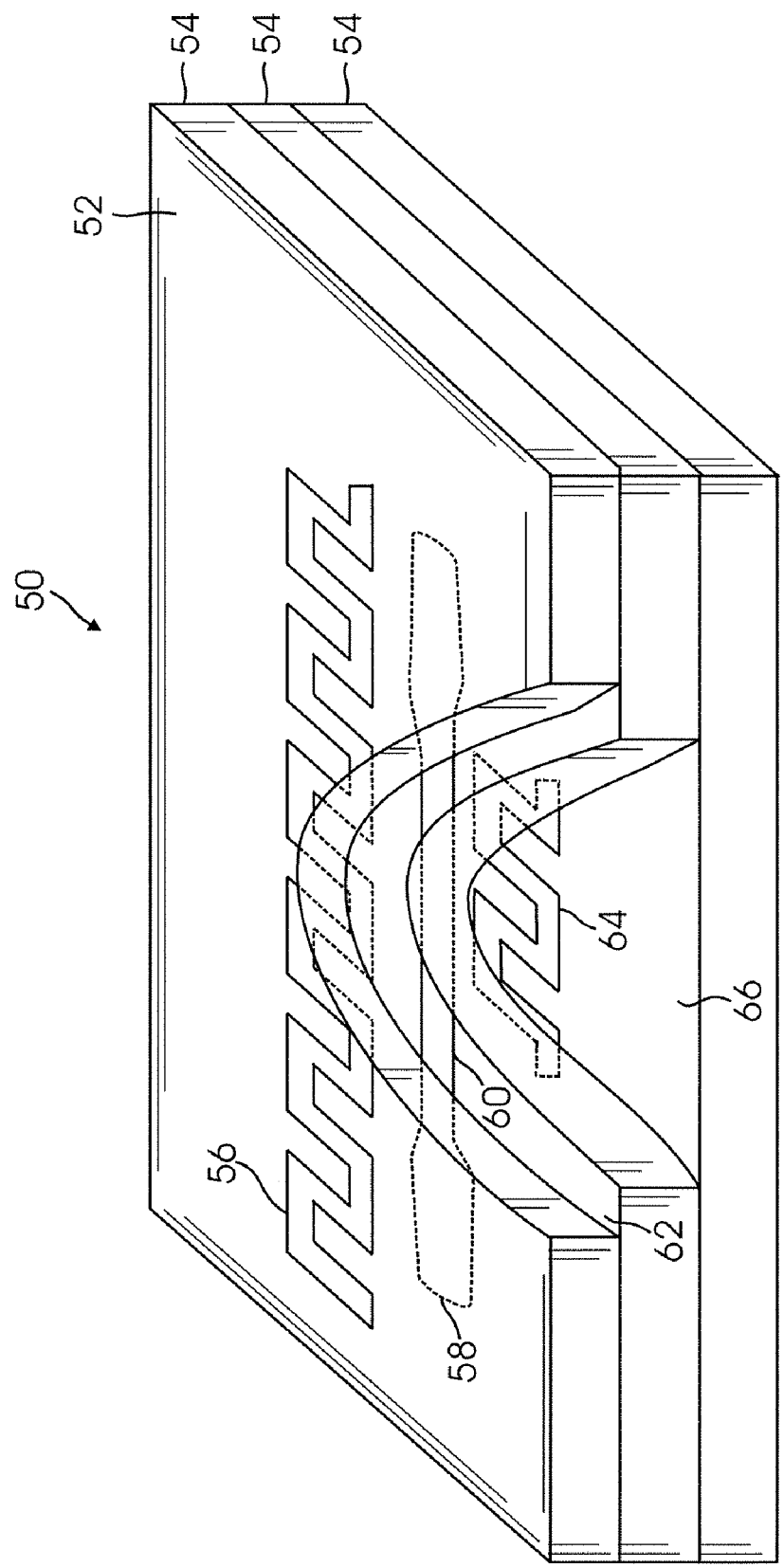
FIG. 3 is a perspective view of a multilayer printed circuit board a section of which is cut-away to show elements of a power control system in accordance with an embodiment of the present invention.

An embodiment of a power control system 50 in accordance with the present invention is shown in FIG. 3. The printed circuit board can be constructed from a number of patterned layers of metal 52, 62 and 66 that are separated by layers of dielectric material 54. The first layer of metal 52 can be patterned with a circuit trace 56 that can act as a heating element. The second layer of metal 62 can be patterned with a circuit trace 60 that can act as a fusible link. The third layer of metal 66 can also be patterned with a circuit trace 64 that can act as a heating element. A heating element controller (not shown) can be mounted on the printed circuit board. A fusible device (not shown) can be mounted on the board or located external to the board.

In one embodiment, the heating element controller can monitor the current flowing through the circuit trace 60 acting as a fusible link. If the heating element controller detects a fault, then it activates a switch (not shown) causing current to flow through the circuit traces 56 and 64 that can act as heating elements. In many embodiments, the switch can be a FET. In other embodiments, the switch can be any device capable of changing the course of current in a circuit. The heating elements can heat the circuit trace acting as a fusible link, which can cause the trace to melt. Melting the trace prevents current from flowing through the trace to the load. In this way, the heating element controller and heating elements can enable the fusible link to respond more rapidly to a fault.

Figure 3A:
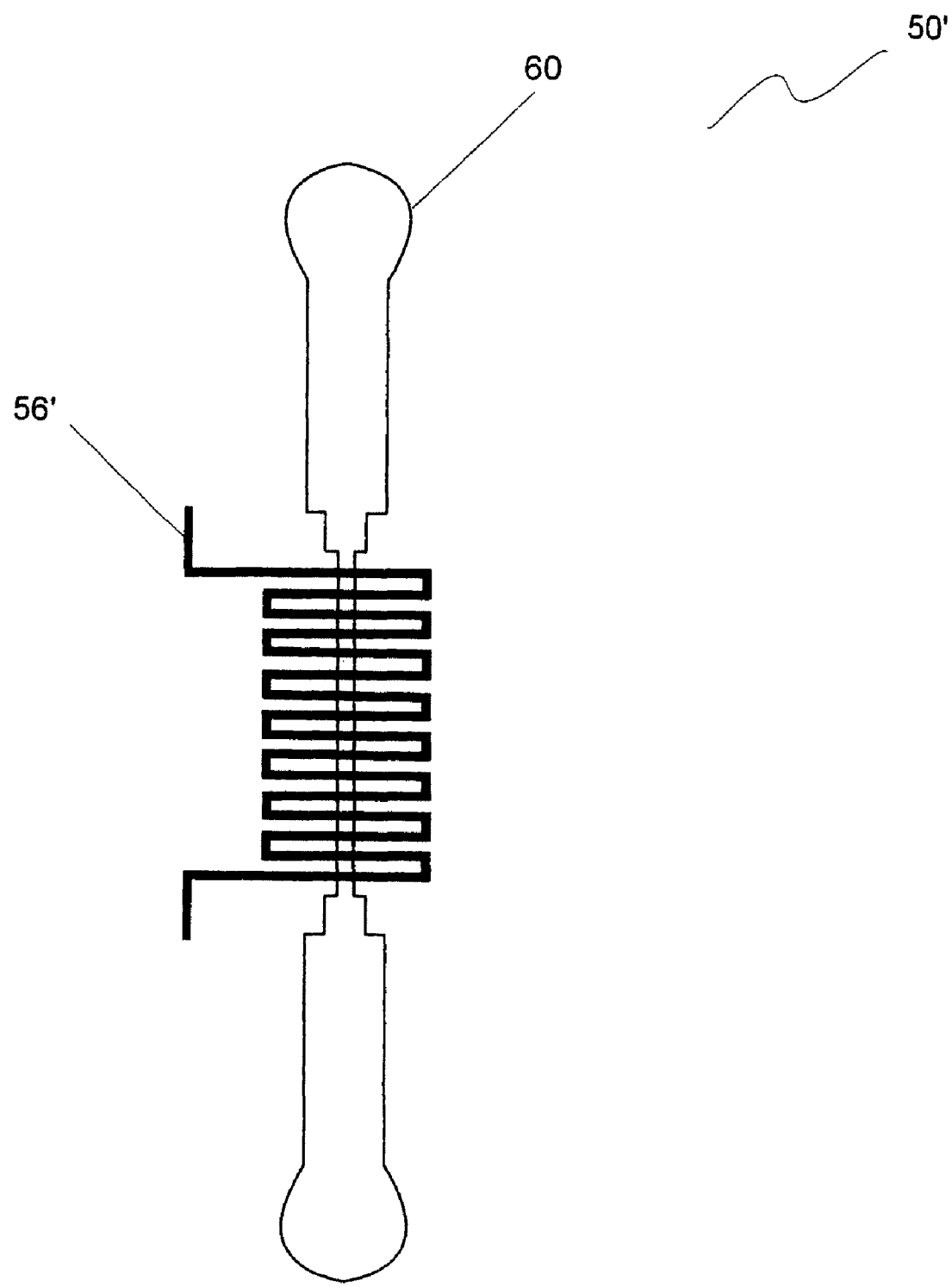
FIG. 3a is a top view of a similar embodiment of the multilayer printed circuit board of FIG. 3 with a transparent top layer in accordance with aspects of the present invention.

A top view of a printed circuit board similar to the multi-layer printed circuit board of FIG. 3 with a transparent top layer in accordance with aspects of the present invention is shown in FIG. 3a. A power control system 50' can include a heating element in the form of a circuit trace 56' and a fusible link also in the form of a circuit trace 60. The heating element trace 56' can be located on the top layer of a printed circuit board while the fusible circuit trace can be located on a first internal layer. When a fault is detected, a heating element controller (not shown) can enable current to flow through the heating element trace 56' and cause the fusible trace 60 to melt. The orientation of both the fusible and heating traces can provide for substantial heat transfer. A second heating element trace (not shown) can be located on a bottom layer (not shown) as in the embodiment of FIG. 3.

Figure 4:
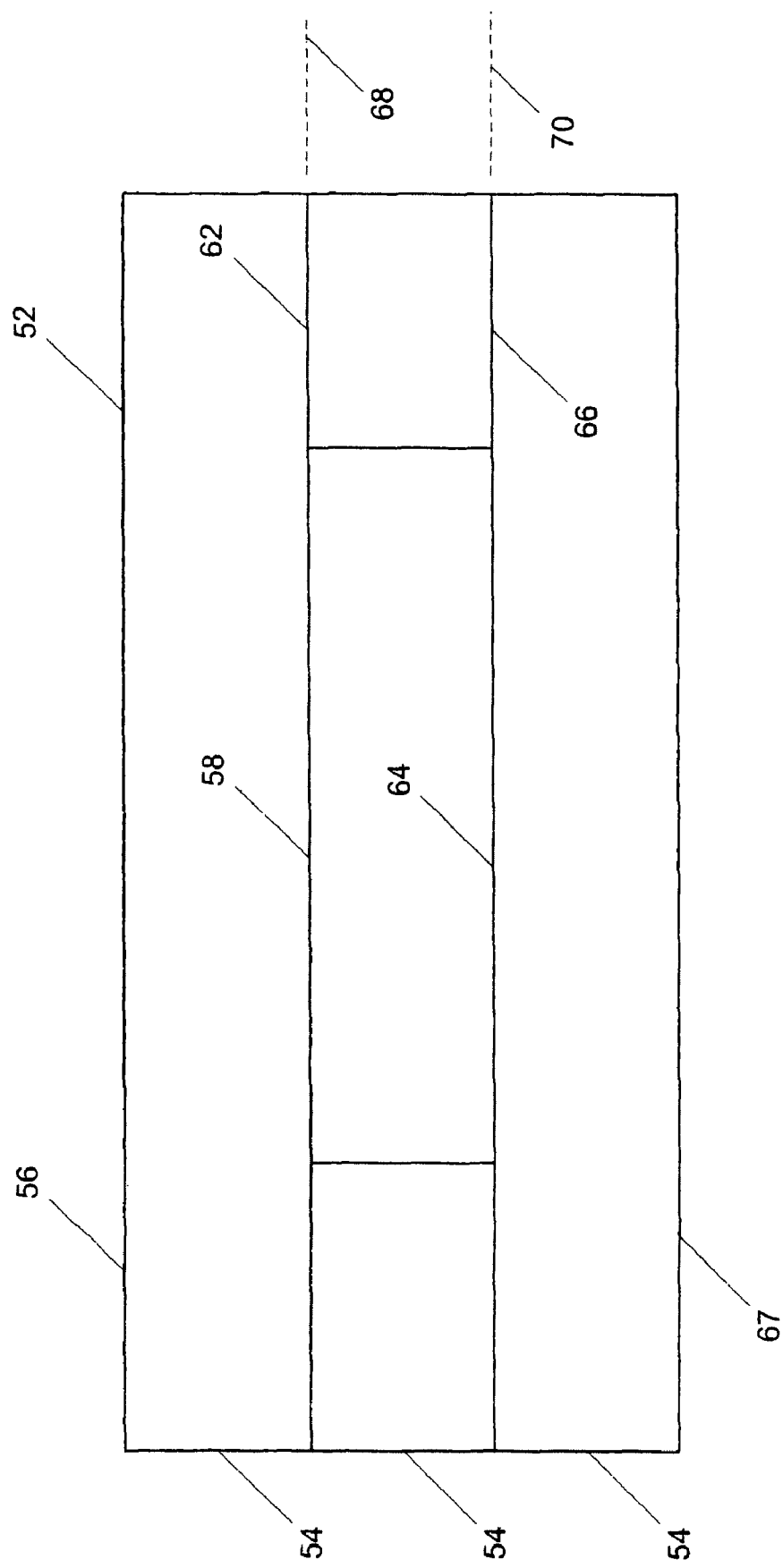
FIG. 4 is a side view of the printed circuit board shown in FIG. 3.

A side view of the printed circuit board shown in FIG. 3 is illustrated in FIG. 4. The printed circuit board includes a top layer 52 which includes a circuit trace that can act as a heating element. The top layer is separated from a first internal layer 58 by a layer of dielectric material 54. The first internal layer includes a trace that can be used as a fusible link. The first internal layer is separated from a second internal layer 66 by another layer of dielectric 54. The second internal layer also includes a circuit trace that can act as a heating element. The second internal layer is separated from a bottom layer 67 by yet another layer of dielectric 54.

The top layer and internal layers can be constructed in various ways. The dielectric layers can be constructed using a thermally conductive dielectric material such as FR-4 or kapton. In other embodiments, other dielectric materials possessing sufficient dielectric constants and sufficient thermal conductivity can be used. In one embodiment, the top layer has a thickness of no more than 3 mils. The first internal layer or middle layer can have a thickness of no more than 3 mils. The second internal layer or bottom layer can have a thickness of at least 3 mils. In other embodiments dielectric layers having other thickness can be used. For example, the dielectric layers can have a thickness at least sufficient to electrically isolate the circuit traces on adjacent layers of the printed circuit board.

Figure 5:
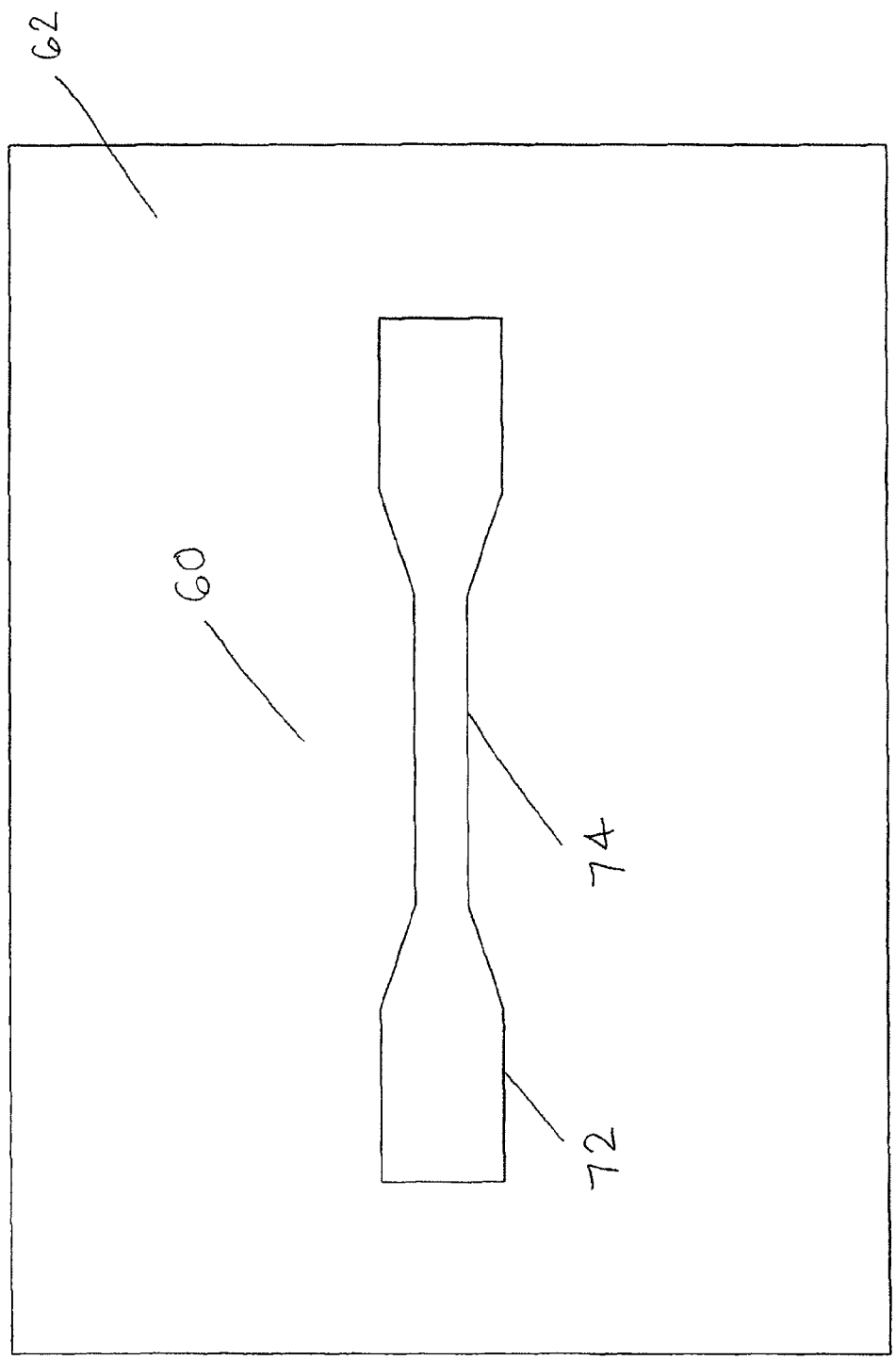
FIG. 5 is a cross sectional view of the printed circuit board shown in FIG. 3 that illustrates a first internal layer of the printed circuit board.

A cross-sectional view taken along the line 68 showing a view of the first internal layer of the printed circuit board shown in FIG. 4 is illustrated in FIG. 5. The first internal layer 62 can include a circuit trace 60. The circuit trace can have an initial wide section 72 with a standard trace width. The trace then tapers to a narrow section 74. In many embodiments, the narrow section has a width of 12 to 36 mils and a length of 20 to 100 mils.

Various length and width combinations can be used. The combinations can include the following pairs (length in mils: width in mils): 100:36, 100:24, 100:12, 50:36, 50:24, 50:12, 20:36, 20:24, 20:12. The narrow section of the circuit trace can act as a fusible link. The length and width of the narrow section typically depend upon the amount of current passing through the link in the absence of a fault and the time required for the link to fuse in the event of a fault. The narrower the trace in the narrow section, the higher the resistance of the trace to current flow in operation. Increased resistance results in greater heat generation. In several embodiments, the trace is dimensioned to provide minimal resistance during normal operation. In other embodiments, greater resistance can be tolerated. In one embodiment, the trace is constructed from copper. In another embodiment, the trace is constructed from silver. In other embodiments, the trace is constructed from any electrically conductive material capable of fusing at an appropriate temperature.

Figure 5A:
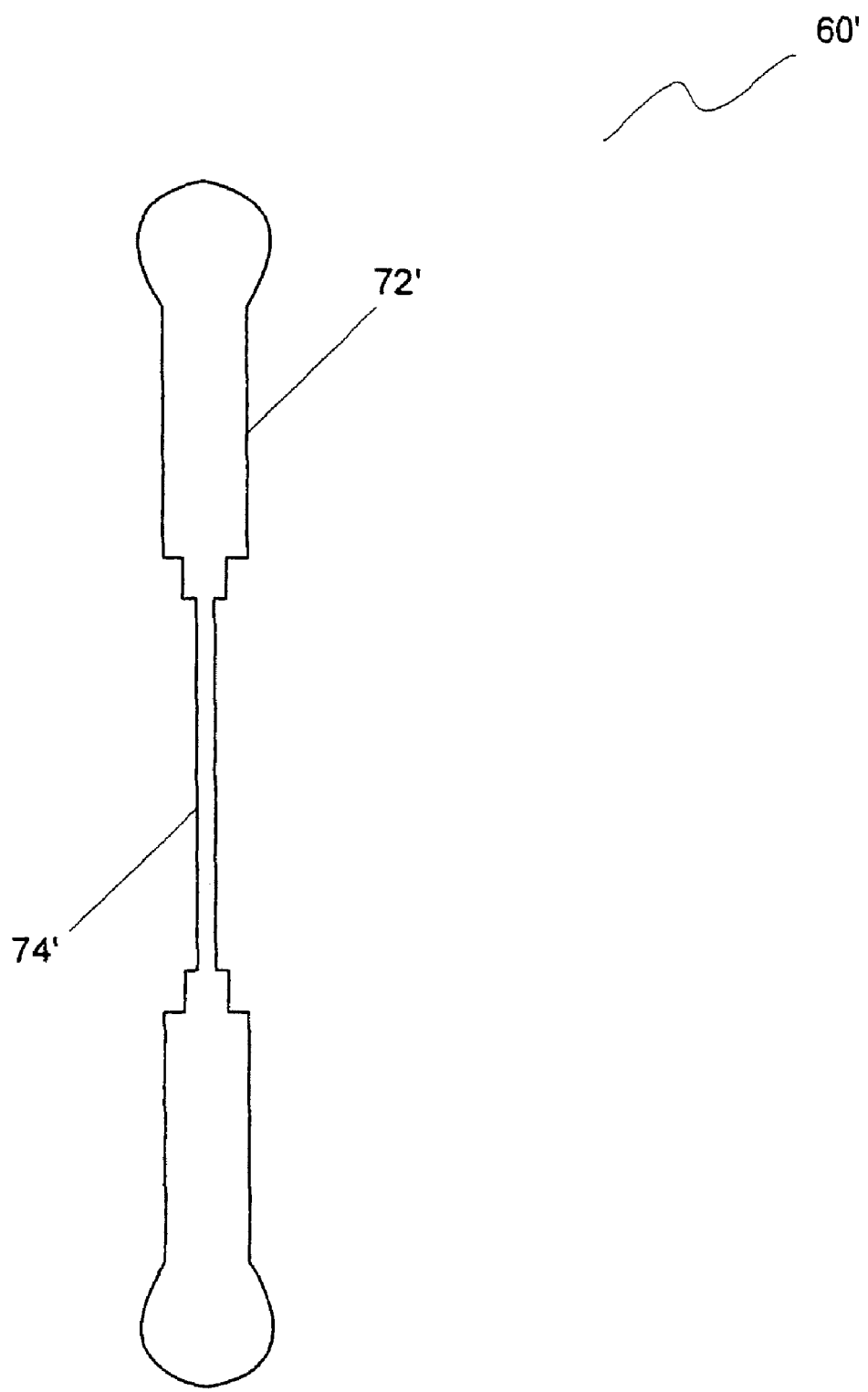
FIG. 5a is a cross sectional view of a similar embodiment of the printed circuit board shown in FIG. 3 that illustrates a first internal layer of the printed circuit board in accordance with aspects of the present invention.

A cross sectional view of a similar embodiment to the fusible link shown in FIG. 3 that illustrates a first internal layer of the printed circuit board in accordance with aspects of the present invention is shown in FIG. 5a. This embodiment of a fusible circuit trace 60' can include an initial wide section 72' and a narrow section 74'. These elements can take various lengths and widths as described above for FIG. 5. The narrow section 74' can act as a fusible link.

Figure 6:
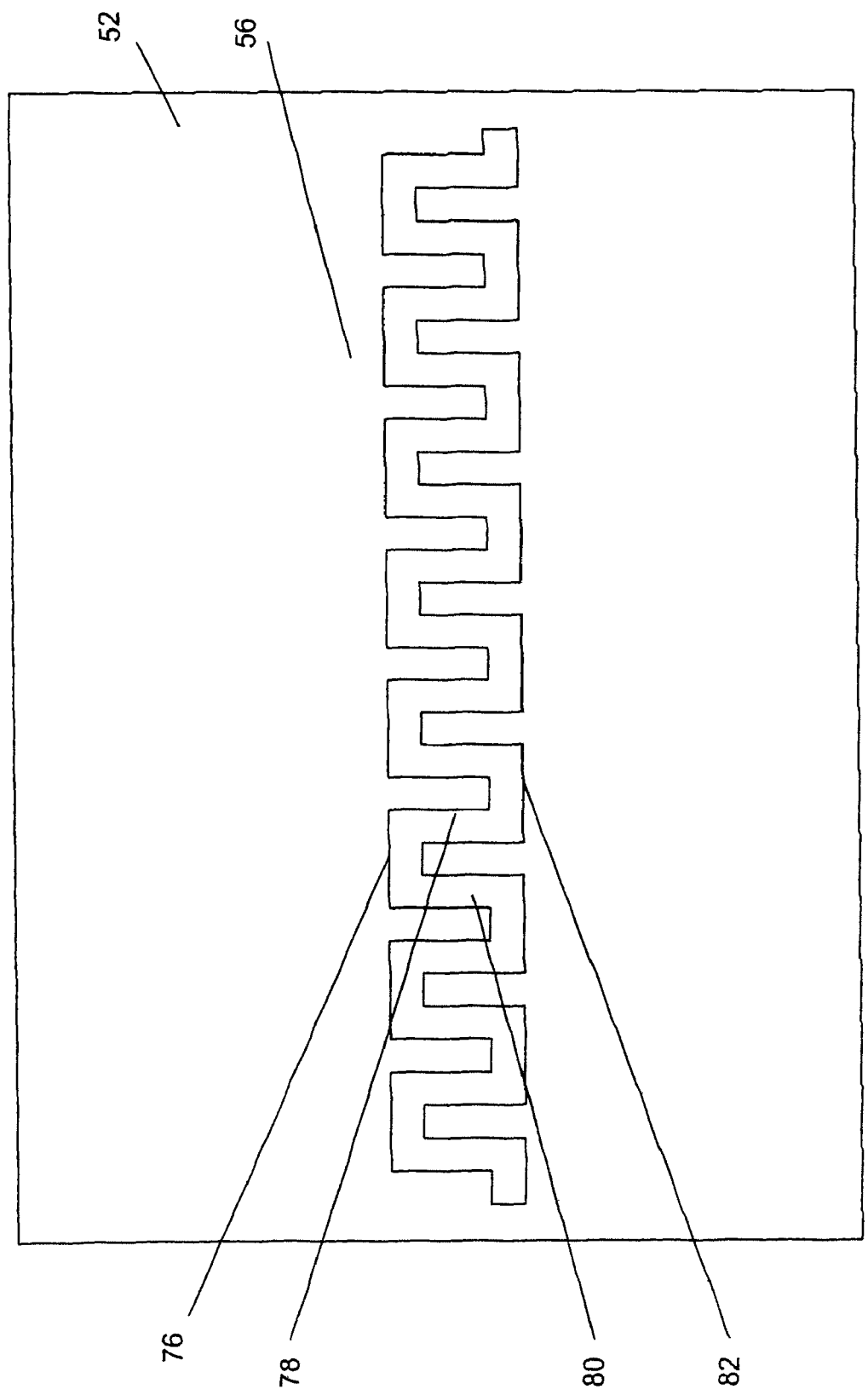
FIG. 6 is a top view of the top layer of the printed circuit board shown in FIG. 3.

A top view of the top layer of the printed circuit board shown in FIG. 3 is illustrated in FIG. 6. The top layer 52 includes a circuit trace 56 that can act as a heating element. In the illustrated embodiment, the circuit trace forms a repeating pattern. The pattern involves a first section 82 connected to a first perpendicular section 78. The first perpendicular section 78 is connected to a second section 76 that is approximately parallel to the first section 82. The second section 76 is connected to a second perpendicular section 80 that is approximately parallel to the first perpendicular section and then the pattern repeats. In one embodiment, the width of the traces and spacing between traces are 7 mils. In other embodiments, the width and spacing can be more than or less than 7 mils.

Decreasing the width of the circuit trace and decreasing the spacing between the perpendicular sections increases the amount of heat generated by the circuit trace. In other embodiments, other circuit trace configurations can be used to form a heating element. In one embodiment, the circuit traces are constructed using copper. In other embodiments, the traces are constructed of other suitable materials.

Figure 7:
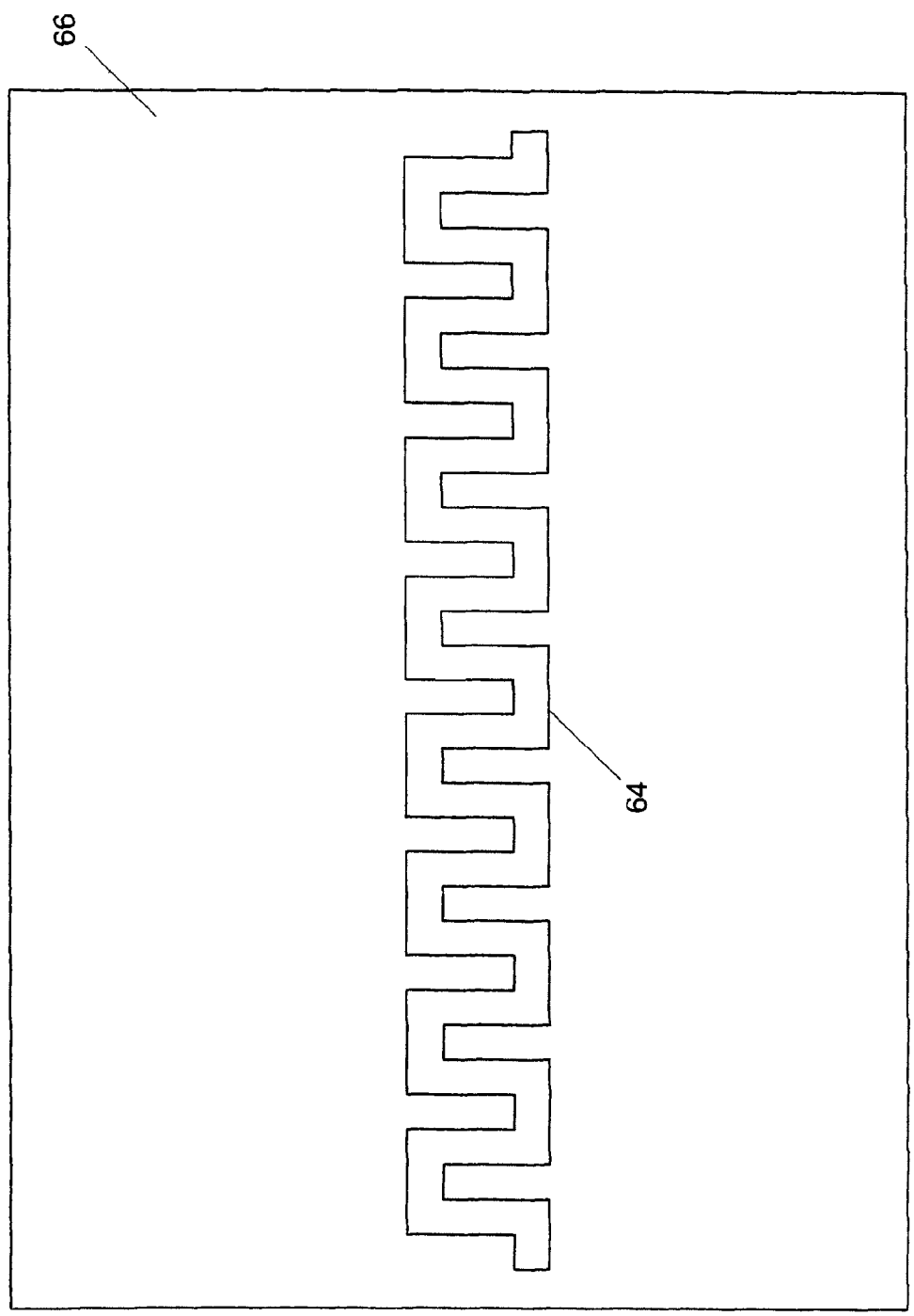
FIG. 7 is another cross sectional view of the printed circuit board shown in FIG. 3 that illustrates a second internal layer of the printed circuit board.

A cross-sectional view taken along the line 70 showing a view of the second internal layer of the printed circuit board shown in FIG. 4 is illustrated in FIG. 7. The second internal layer 66 includes a circuit trace that can act as a heating element. The circuit trace shown in the illustrated embodiment is similar to the circuit trace shown in FIG. 6. In other embodiments, different circuit trace configurations can be used on different layers of a printed circuit board to implement a heating element.

While the above description contains many specific embodiments of the invention, these should not be construed as limitations on the scope of the invention, but rather as an example of one embodiment thereof. Many other variations are possible. For example, the heating element can be implemented as a single layer in a printed circuit board or on more than two layers of a printed circuit board. Alternatively, the heating element can be implemented without the use of a printed circuit board. Accordingly, the scope of the invention should be determined not by the embodiments illustrated, but by the appended claims and their equivalents.

What is claimed is:

1. A power control system, comprising:
   a device having an output;
   a fusible link coupled to the output of the device;
   a heating element controller; and
   at least one heating element coupled to the heating element controller, where the heating element controller is configured to control the flow of current through the heating element;
   wherein the heating element controller is configured to monitor activity of the device;
   wherein the heating element is configured to generate sufficient heat to fuse the fusible link within a predetermined time period when current flows through the heating element;
   wherein the fusible link comprises a circuit trace;
   wherein the heating element comprises a circuit trace having a repeating pattern comprising a first section and a second section connected perpendicular to the first section; and
   wherein the heating element is configured to concentrate the generated heat on the fusible link.

2. The power control system of claim 1, wherein the fusible link is connected to the heating element controller.

3. The power control system of claim 2, wherein the heating element controller is configured to control the flow of current from the fusible link to the at least one heating element.

4. The power control system of claim 3, wherein the heating element controller is configured to measure a current flowing from the device to the fusible link.

5. The power control system of claim 1, wherein the device is a field effect transistor.

6. The power control system of claim 1, wherein the heating element controller includes a microprocessor.

7. The power control system of claim 1, wherein at least one heating element is proximate the fusible link.

8. The power control system of claim 1, wherein the device is an electromechanical device.

9. The power control system of claim 8, wherein the electromechanical device is a relay or a contactor.

10. The power control system of claim 1, further comprising:
a power source connected to the heating element controller;
wherein the heating element controller is configured to control the flow of current from the power source to the at least one heating element.

11. The power control system of claim 1:
wherein the heating element is disposed on a first layer; and
wherein the fusible link is disposed on a second layer adjacent to the first layer.

12. The power control system of claim 11, further comprising:
a second heating element disposed on a third layer;
wherein the second layer is disposed between the first layer and the third layer.

13. The power control system of claim 11, wherein the repeating pattern of the heating element crosses a projection of the fusible link circuit trace onto the second layer at a plurality of locations along the projection.

14. The power control system of claim 1, wherein the repeating pattern comprises a shape configured to maximize the generated heat to be transferred to the fusible link.

15. The power control system of claim 1, wherein the repeating pattern is positioned to maximize the generated heat to be transferred to the fusible link.

16. A power control system, comprising:
a microprocessor coupled to a first switching device and a sensor circuit;
a heating element coupled to the first switching device;
a second switching device coupled to the sensor circuit;
a fusible link coupled to the second switching device and the first switching device; and
a load coupled to the fusible link;
wherein the sensor circuit is configured to monitor a connection between the second switching device and the fusible link;
wherein the fusible link comprises a circuit trace;
wherein the heating element comprises a circuit trace having a repeating pattern comprising a first section and a second section connected perpendicular to the first section; and
wherein the heating element is configured to concentrate the generated heat on the fusible link.

17. The power control system of claim 16, wherein:
the microprocessor is configured to monitor the state of the second switching device and measure a current flowing from the second switching device to the fusible link using at least the sensor circuit;
the microprocessor is configured to control the first switching device;
the first switch device is configured to control the current flow through the heating element; and
the heating element is proximate the fusible link.

18. The power control system of claim 17, wherein the microprocessor and the second switching device are components of a solid state power controller.

19. The power control system of claim 17, wherein the second switching device is a field effect transistor.

20. The power control system of claim 17, wherein the second switching device is an electromechanical device.

21. The power control system of claim 20, wherein the electromechanical device is a relay or a contactor.

22. The power control system of claim 19, wherein the second switching device and the microprocessor are components of a solid state power controller.

23. The power control system of claim 16, wherein the fusible link and heating element circuit traces are formed on a printed wiring board.

24. The power control system of claim 23, wherein the heating element circuit trace comprises vertical segments and horizontal segments and two ends.

25. The power control system of claim 24, wherein:
the vertical segments are equal in length;
the horizontal segments are equal in length;
adjacent vertical segments and horizontal segments are perpendicular to one another and are connected to each other; and
the fusible link circuit trace and vertical segments run perpendicular to each other.

26. The power control system of claim 24, wherein the vertical segments are longer than the horizontal segments.

27. The power control system of claim 23, wherein the printed circuit board comprises a dielectric layer that includes FR-4.

28. The power control system of claim 23, wherein the printed circuit board comprises a dielectric layer that includes Kapton.

29. The power control system of claim 23, further comprising:
a second heating element comprising a circuit trace having a repeating pattern comprising a first section and a second section connected perpendicular to the first section;
wherein the heating element is disposed on a first layer of the printed wiring board;
wherein the fusible link is disposed on a second layer of the printed wiring board;
wherein the second heating element is disposed on a third layer of the printed wiring board; and
wherein the second layer is disposed between the first layer and the third layer.

30. The power control system of claim 29, wherein:
the fusible link circuit trace has two ends and a middle portion; and
the middle portion is narrower than the ends.

31. The power control system of claim 30, wherein:
the printed wiring board includes a top layer, a middle layer, and a bottom layer;
the top layer and bottom layer have a thickness of no more than 3 mils; and
the bottom layer has a thickness of no less than 3 mils.

32. A printed circuit board, comprising:
a first trace; and
a second trace proximate the first trace;
wherein the first trace is configured to fuse when a current exceeding a first threshold flows through the first trace and the second trace;
wherein the second trace connects a first point to a second point;
wherein the length of the second trace is greater than the distance between the first and second points;
wherein the second trace is configured to generate heat;
wherein the first trace is configured to receive the generated heat; and
wherein the second trace is configured to concentrate the generated heat on the fusible link.

33. The printed circuit board of claim 32, wherein the first trace is located on a first layer and the second trace is located on a second layer.

34. The printed circuit board of claim 33, wherein the first trace and the second trace are located on adjacent layers of the printed wiring board.

35. The printed circuit board of claim 32, further comprising:
- a third trace proximate the first trace;
- wherein, the third trace connects a first point to a second point; and
- the length of the third trace is greater than the distance between the first and second points.

36. The printed circuit board of claim 32, wherein the second trace includes a repeating pattern comprising a first section and a second section connected perpendicular to the first section.

37. The printed circuit board of claim 32, wherein the first trace comprises:
- at least a first section possessing a first width; and
- at least a second section possessing a second width;
- wherein the first width is greater than the second width.

38. A method of operating a power control system with a fusible link comprising:
- measuring a current flow;
- measuring a device state;
- determining whether a fault has occurred using the measured current flow and determined device state; and
- generating heat proximate the fusible link using a heating element;
- wherein the fusible link comprises a circuit trace;
- wherein the heating element comprises a circuit trace having a repeating pattern comprising a first section and a second section connected perpendicular to the first section; and
- wherein the heating element is configured to concentrate the generated heat on the fusible link.

* * * * *